(12) United States Patent
Chen et al.

(10) Patent No.: US 11,936,645 B2
(45) Date of Patent: *Mar. 19, 2024

(54) SMART SECURITY STORAGE SYSTEM

(71) Applicant: Kingston Digital, Inc., Fountain Valley, CA (US)

(72) Inventors: Ben Wei Chen, Fountain Valley, CA (US); Chih-Hung Wu, Hsinchu (TW)

(73) Assignee: Kingston Digital, Inc., Fountain Valley, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/353,744

(22) Filed: Jun. 21, 2021

(65) Prior Publication Data

US 2021/0314315 A1  Oct. 7, 2021

Related U.S. Application Data

(60) Continuation-in-part of application No. 17/104,490, filed on Nov. 25, 2020, which is a division of
(Continued)

(51) Int. Cl.
*H04L 9/40* (2022.01)
*G06F 3/06* (2006.01)
(Continued)

(52) U.S. Cl.
CPC .......... *H04L 63/0853* (2013.01); *G06F 3/062* (2013.01); *G06F 21/6218* (2013.01);
(Continued)

(58) Field of Classification Search
CPC .. H04L 63/0853; H04W 12/06; H04W 12/08; H04W 12/40; G06F 21/6245; G06F 21/6218; G06F 21/78
See application file for complete search history.

(56) References Cited

U.S. PATENT DOCUMENTS 7,117,369 B1   10/2006   Burns et al.
8,661,429 B2   2/2014    Ruster
(Continued)

FOREIGN PATENT DOCUMENTS

GB   2561030 A      10/2018
TW   201626287 A    7/2016
(Continued)

OTHER PUBLICATIONS

F.-Y. Yang, T.-D. Wu and S.-H. Chiu, "A secure control protocol for USB mass storage devices," in IEEE Transactions on Consumer Electronics, vol. 56, No. 4, pp. 2239-2343, Nov. 2010. (Year: 2010).*
(Continued)

*Primary Examiner* — Kari L Schmidt
(74) *Attorney, Agent, or Firm* — Shih IP Law Group, PLLC

(57) ABSTRACT

Security functions for a memory corresponding to a smart security storage may be facilitated or executed through operation of utility application corresponding to a smart device. For example, encryption/decryption of data stored on the memory may be facilitated or executed by a security module under control of an access application corresponding to the smart device. Data securely stored on the memory may be explored and accessed by the smart device or a host computing device under control of the access application.

18 Claims, 2 Drawing Sheets

Related U.S. Application Data application No. 15/474,041, filed on Mar. 30, 2017, now Pat. No. 10,880,296.

(51) Int. Cl.

| | | |
|---|---|---|
| *G06F 21/62* | (2013.01) | |
| *G06F 21/78* | (2013.01) | |
| *H04W 12/06* | (2021.01) | |
| *H04W 12/08* | (2021.01) | |
| *H04W 12/40* | (2021.01) | |

(52) U.S. Cl.
CPC ............ *G06F 21/78* (2013.01); *H04W 12/06* (2013.01); *H04W 12/08* (2013.01); *H04W 12/40* (2021.01)

(56) References Cited

U.S. PATENT DOCUMENTS

| | | | |
|---|---|---|---|
| 9,146,850 B2 | 9/2015 | Fitzpatrick | |
| 9,244,519 B1 | 1/2016 | Ellis | |
| 10,712,081 B2 | 7/2020 | Na | |
| 10,904,292 B1 | 1/2021 | Anderson | |
| 2001/0043611 A1 | 11/2001 | Kadambi | |
| 2003/0120967 A1* | 6/2003 | Miller | H04L 1/22 714/22 |
| 2004/0003262 A1* | 1/2004 | England | G06F 12/1408 713/189 |
| 2004/0059925 A1 | 3/2004 | Benhammou et al. | |
| 2004/0177215 A1 | 9/2004 | Nagamasa | |
| 2005/0091419 A1 | 4/2005 | Ohashi et al. | |
| 2006/0204047 A1 | 9/2006 | Dave et al. | |
| 2006/0277598 A1* | 12/2006 | Ahn | G06F 21/10 713/193 |
| 2006/0294105 A1* | 12/2006 | Rosenan | G06F 9/44584 707/999.009 |
| 2008/0028146 A1 | 1/2008 | Pan et al. | |
| 2008/0034421 A1* | 2/2008 | Ahn | H04L 63/10 709/248 |
| 2008/0069358 A1 | 3/2008 | Yang | |
| 2008/0086639 A1* | 4/2008 | Kono | G06F 21/72 713/168 |
| 2009/0070593 A1 | 3/2009 | Boshra | |
| 2009/0121029 A1 | 5/2009 | Asnaashari et al. | |
| 2009/0122989 A1 | 5/2009 | Asnaashari et al. | |
| 2009/0125643 A1 | 5/2009 | Prevost et al. | |
| 2009/0228623 A1* | 9/2009 | Tsuchiya | G06F 13/385 710/72 |
| 2009/0287792 A1* | 11/2009 | Kim | G06F 13/385 709/212 |
| 2009/0319798 A1* | 12/2009 | Ooi | G06F 21/79 713/182 |
| 2010/0128632 A1* | 5/2010 | Mantysalo | H04M 1/6066 370/254 |
| 2010/0199086 A1 | 8/2010 | Kuang | |
| 2010/0293374 A1* | 11/2010 | Bushby | H04L 9/3231 713/168 |
| 2011/0016256 A1* | 1/2011 | Hatada | G06F 13/385 710/316 |
| 2011/0185435 A1 | 7/2011 | Chang | |
| 2011/0286343 A1* | 11/2011 | Powell | H04W 76/10 370/252 |
| 2013/0132739 A1 | 5/2013 | Matsushiba et al. | |
| 2013/0155959 A1* | 6/2013 | Ikeda | H04W 36/14 370/328 |
| 2013/0269026 A1 | 10/2013 | Deluca | |
| 2013/0282962 A1 | 10/2013 | Rub | |
| 2013/0283049 A1 | 10/2013 | Brown | |
| 2015/0289402 A1* | 10/2015 | Tang | H05K 5/0278 361/679.4 |
| 2015/0363341 A1 | 12/2015 | Lien et al. | |
| 2016/0028713 A1 | 1/2016 | Chui et al. | |
| 2016/0048465 A1 | 2/2016 | Chuang | |
| 2016/0094526 A1* | 3/2016 | Shaw | H04L 63/166 713/154 |
| 2016/0269958 A1* | 9/2016 | Tanigawa | H04B 7/15 |
| 2017/0289800 A1 | 10/2017 | Frusina | |
| 2019/0297497 A1* | 9/2019 | Frusina | H04W 12/06 |
| 2020/0301898 A1* | 9/2020 | Samynathan | G06F 16/2453 |

FOREIGN PATENT DOCUMENTS

| | | |
|---|---|---|
| TW | M531642 U | 11/2016 |
| WO | 2009/064632 A2 | 5/2009 |
| WO | 2009130538 A2 | 10/2009 |
| WO | 2010052722 A1 | 5/2010 |
| WO | 2014105228 A1 | 7/2014 |

OTHER PUBLICATIONS

Dave Jing Tian, Adam Bates, and Kevin Butler. 2015. Defending Against Malicious USB Firmware with GoodUSB. In Proceedings of the 31st Annual Computer Security Applications Conference (ACSAC '15). Association for Computing Machinery, New York, NY, USA, 261-270. (Year: 2015).*

Combined Search and Examination Report from application No. GB1912685.3 dated Jan. 15, 2020.

Combined Search and Examination Report for Application No. GB1710154.4, ddated Jan. 29, 2018, 8 pages.

UK Search Report from application No. GB2104298.1 dated May 6, 2021, 1 page.

Combined Search and Examination Report from GB2109868.6 dated Dec. 21, 2022, 6 pages.

T. J. Jeyaprabha, G. Sumathi and P. Nivedha, "Smart and secure data storage using Encrypt-interleaving," 2017 Innovations in Power and Advanced Computing Technologies (i-PACT), Vellore, India, 2017, pp. 1-6. (Year: 2017).

Aga, Shaizeen, and Satish Narayanasamy. "Invisimem: Smart memory defenses for memory bus side channel." ACM SIGARCH Computer Architecture News 45.2 (2017): 94-106. (Year: 2017).

\* cited by examiner

SMART SECURITY STORAGE SYSTEM

CROSS-REFERENCE TO RELATED APPLICATION

This application is a continuation-in-part of U.S. patent application Ser. No. 17/104,490, filed Nov. 25, 2020; which is a Divisional of U.S. patent Ser. No. 15/474,041, filed Mar. 30, 2017, entitled "SMART SECURITY STORAGE"; of which is incorporated herein by reference in their entireties. Other related patent and applications: U.S. Pat. No. 10,888,296 B2, filed Mar. 30, 2017, entitled "SMART SECURITY STORAGE"; U.S. Pat. No. 8,607,070 B2, filed Dec. 20, 2006, entitled "SECURE STORAGE SYSTEM AND METHOD OF USE"; U.S. Pat. No. 8,010,768 B2, filed May 9, 2007, entitled "SECURE AND SCALABLE SOLID STATE DISK SYSTEM"; U.S. Pat. No. 8,527,781 B2, filed May 9, 2007, entitled "SECURE AND SCALABLE SOLID STATE DISK SYSTEM"; U.S. Pat. No. 8,499,168 B2, filed May 9, 2007, entitled "SECURE AND SCALABLE SOLID STATE DISK SYSTEM"; all of which are incorporated herein by reference in their entireties.

BACKGROUND

The embodiments described herein pertain to secure data storage as facilitate or executed by a remote smart device.

Typically, a security module, which is responsible for facilitating execution of security functions for a storage device, was embedded within the host computing device, which has the computing power to effectively handle identification, authentication and software encryption/decryption security functions. Gradually, the security module was moved beyond the host computing device to forms such as a smart card or SIM card, to facilitate or execute execution of the aforementioned security functions for a portable device.

FIG. 1 shows an example of a known storage configuration. Security module 115 of a portable or handheld device is embedded into modular device 110 to facilitate or execute at least some security functions, including identification, authentication, and software encryption/decryption, all upon receiving instructions received from host computing device 105.

In other configurations, host computing device 105 has a utility application 130 that issues instructions to the modular device, which processes the instructions via a user input module 145 and the requested security functions. The security function, including identification, authentication, access control, and encryption/decryption are performed by hardware, in a security module 115 of the modular device.

SUMMARY

In one example embodiment, a system comprises a host computing device, a smart device, and a smart security storage. The smart device includes an access application to authenticate a user of the smart device and to control security functionality for access of data stored on a memory corresponding to the smart security storage, for both the host computing device and the smart device. The smart security storage includes a memory to store data; a communication module to communicate with the host computing device; a smart device interface module to communicate with the smart device and to control interface traffic of the communication module to allow authorized access to the data stored on the memory, upon execution of one or more security operations; and a security module to execute the security operations to be performed on the stored data based on instructions received from the smart device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
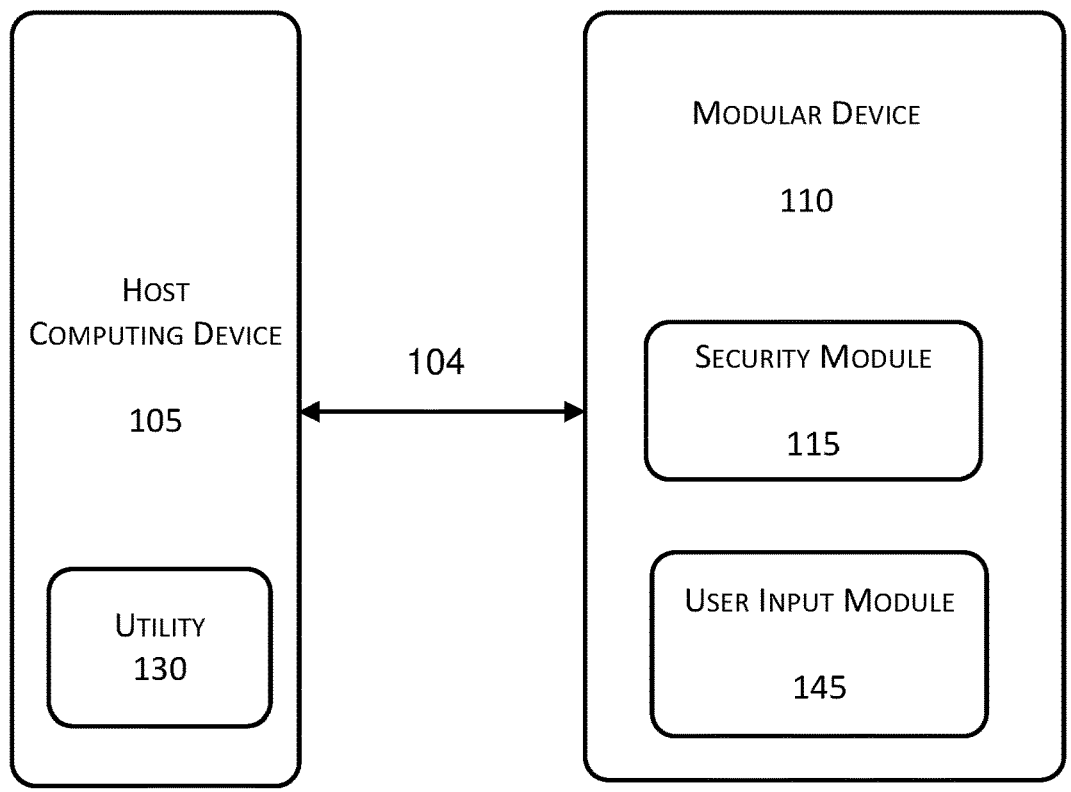
FIG. 1 shows an example of a known storage configuration.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

The embodiments described herein provide a smart security storage that interfaces with a conventional host computing device as well as increasingly ubiquitous smart devices, by providing every security feature common to the convention host computing device, including identification, authentication, access control, and hardware encryption/decryption. The embodiments described herein utilize an access application hosted and/or operated on the smart device through a host communication channel and smart device interface channel in wired, wireless and biometric manner.

Figure 2:
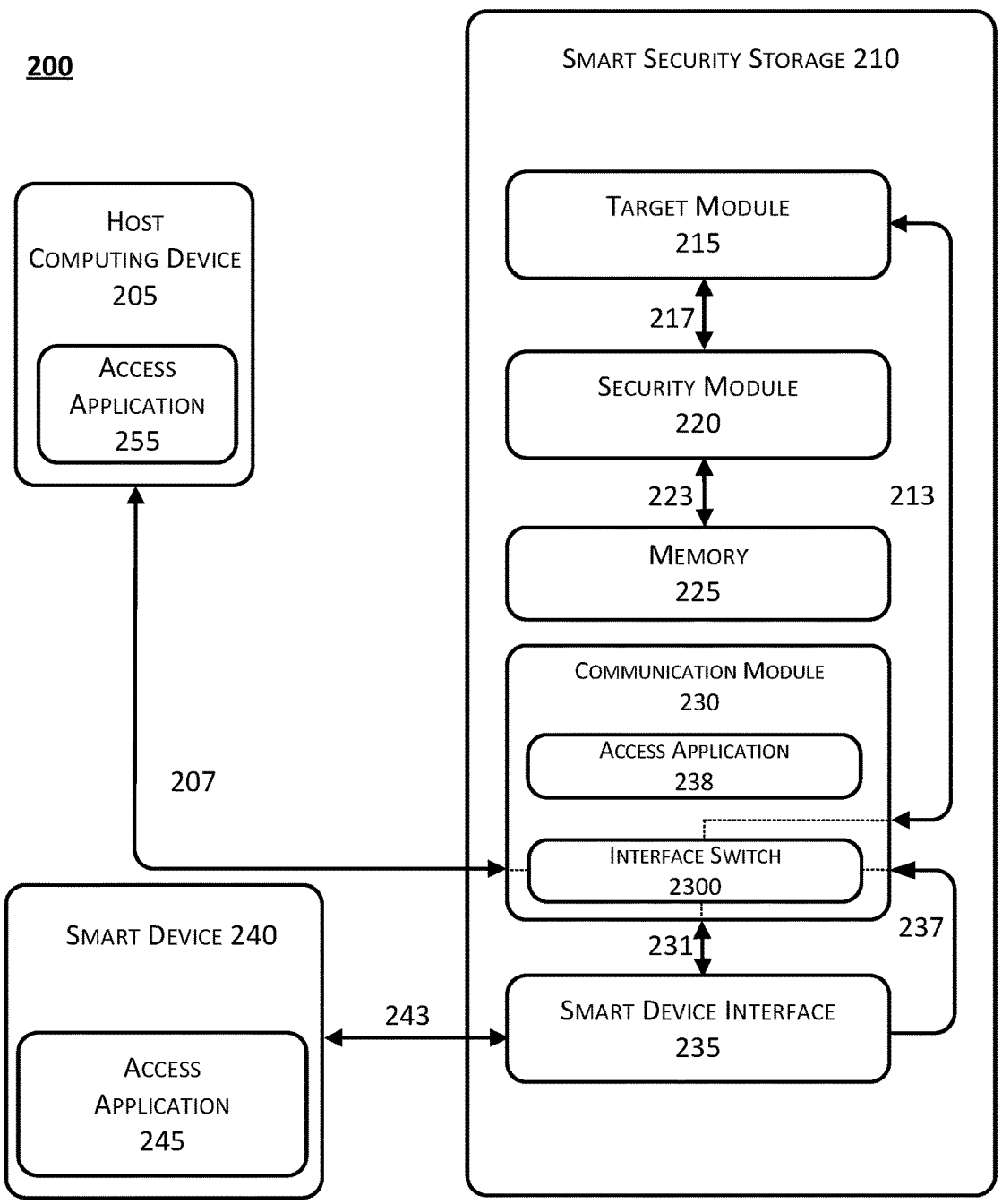
FIG. 2 shows an example implementation of smart security storage in accordance with at least some of the examples described herein.

FIG. 2 shows an example configuration of smart security storage in accordance with at least some of the examples described herein.

As depicted herein, configuration 200 in which facets of smart security storage are implemented includes, at least, host device 205, smart security storage 210, and smart device 240. Smart security storage 210 includes, at least, target module 215, security module 220, memory 225, communication module 230, and smart device interface 235. Smart device 240 includes, at least, access application 245. Smart security storage 210 may be communicatively connected to smart device 240 by interface communication channel 243; and smart security storage 210 may be communicatively connected to host computing device 205 by communication channel 207. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of hardware, software, firmware, or virtually any combination thereof.

Host computing device 205 may refer to a computer having a processor, memory, and an input/output (I/O) controller. The memory may include random access memory (RAM). The I/O controller may control I/O devices, peripheral devices, a network interface, etc. Examples of the I/O devices may include a keyboard, a mouse, a display, etc., that allow a user to interact with the computer. The peripheral devices may include mass storage devices such as disk drives, etc., used to store an operating system (OS), applications, and data. The network interface may interface the computer to a network, e.g., LAN, Internet, etc. The network interface may be a wireline network interface or a wireless network interface. A logical connection between host computing device 205 and target memory 225 corresponding to smart security storage 210 is dependent upon operation of access application 245 corresponding to smart device 240, via switch select 237.

Smart security storage 210 may refer to a data storage corresponding to one or more local servers or corresponding to a cloud computing environment. In at least one alternative embodiment, smart security storage 210 may be portable. Further, in at least one embodiment, smart security storage 210 may include one or more physical memory integrated circuits or chips.

Target module 215 may refer to a module or component that is designed, programmed, and/or configured to, at least, process high level storage and security functions received from host computing device 205, via communication module 230, and/or received from smart device 240, via communication channel 213. Non-limiting of the high level storage functions include storage exploration and access of data stored on memory 225. High level storage functions may be passed to security module 220 for further processing.

Security module 220 may refer to a module or component that is designed, programmed, and/or configured to, at least, facilitate or execute security functions to protect data stored on memory 225. A non-limiting example of such a security function is the encryption/decryption of data. Security module 220 may also be designed, programmed, and/or configured to serve as a conduit through which target module 215 communicates with memory 225, in accordance with at least some embodiments.

As facilitated or executed by, in cooperation with, or at instruction of security module 220, security functions include several phases including, but not limited to, initialization, security operation, security provisioning, security reset, password authentication, password change, storage input, operation, and storage output operation. These functions, again, facilitated or executed by, in cooperation with, or at instruction of security module 220, are described as follows:

Initialization: During power-up of smart security storage 210, switch select 237 may enable traffic flow between channel 231 and 213. Traffic flow from/to host computing device 205 via channel 207 may be ignored. Smart device interface 235 has local intelligence and is communicatively connected to smart device 240 via channel 243; is designed, programmed, and/or configured to process a command, status, input and output between smart security storage 210 and smart device 240; and is designed, programmed, and/or configured to control three-way traffic flow, using switch select 237, between channel 231 and channel 213 or between channel 207 and channel 213.

Security reset: Using access application 245, a user of smart device 240 may perform a soft or hard reset of smart security storage 210. That is, any security related information on smart security storage 210 may be deleted.

Security operation: Security module 220 may be designed, programmed, and/or configured to generate and process one or more high level security requests from smart device 240 and smart security storage 210. The high level security requests may be routed through channel 243, 231 and 213 to the target module 215. Target module 215 may then be communicatively connected to security module 220, via channel 217 and/or channel 223, depending on the security request. Non-limiting examples of such high level security requests includes: hash password, password authentication, a password change, security reset.

Security module 220 may be designed, programmed, and/or configured to generate and process one or more high level storage requests from one or both of smart device 240 and host computing device 205. The high level storage requests may be routed through channel 243, 231 and 213; or 207 and 213 to the target module 215. Target module 215 may then be communicatively connected to security module 220, via channel 217 and/or channel 223, depending on the storage request. Non-limiting examples of such high level storage requests includes: storage identification, storage command, storage status, storage input operation, storage output operation.

Security provisioning: When the smart security storage 210 is first accessed by a user interaction with access application 245 on smart device 240, interfacing with smart device interface 235, a request is made for a user-defined password to be created and confirmed, e.g., PSWD0. As set forth above, security module 220 may be designed, programmed, and/or configured to facilitate or execute security functions to protect data stored on memory 225. Thus, password PSWD, in the form of passcode or biometric signature, may then be transmitted to smart security storage 210, via communication channel 243, hashed through a one-way hash engine HASH as HASH_PSWD0=HASH (PSWD0), and stored in a non-secured area in smart security storage 210. A random number generator RAN( ) in or corresponding to security module 220 may then be invoked, and a random key RAN_KEY0=RAN_KEY0 may be generated. Password PSWD0 may then be encrypted by a two-way symmetric encryption engine ENC_1 with the key RAN_KEY0 to create an encrypted key PSWD0_RAN_KEY0=ENC_1 (PSWD0, RAN_KEY0). The encrypted key may also be stored in the non-secured area in the smart security storage 210.

Neither the actual password PSWD0 nor the random key RAN_KEY0 is stored on smart security storage 210. The one-way hash engine HASH and the two-way symmetric encryption engine ENC_1 make it virtually impossible for anyone to recover the original password PSWD0 and random key RAN_KEY0 from the stored information of the hash password HASH_PSWD0 and the encrypted key PSWD0_RAN_KEY0. Security is thus achieved on the smart security storage 210. Upon completion of the security provision phase, the smart security storage 210 is ready for use with security enabled. Memory 225 may be partitioned into secured and non-secured/public areas, if necessary, upon instruction from access application 245.

Password authentication: When smart security storage 210 has been provisioned, it is ready for use. A user of smart device 240 may interface with access application 245 to enter password PSWD1, which may be transmitted to target module 215 with a security request for password authentication. Target module may be designed, programmed, and/or configured to check the stored hash password HASH_PSWD0 against the new hash value of HASH (PSWD1). A positive comparison results in password PSWD1 being authenticated. Security module 220 may be further designed, programmed, and/or configured to retrieve the encrypted random key PSWD0_RAN_KEY0 and to perform decryption to recover the random key RAN_KEY1=DEC_1(PSWD1, PSWD0_RAN_KEY0). RAN_KEY1 is identical to original random key RAN_KEY0, if the entered password PSWD1 matches the original password PSWD0.

Password change: A user of smart device 240 may interface with access application 245 to change a password registered with or in smart security storage 210. The user may interface with access application 245 to enter a currently, e.g., the original, registered password by entering PSWD1, as well as the new and confirmed password PSWD2. Similar to password authentication, PSWD2 may be authenticated by checking if the hash value HASH_PSWD1=HASH(PSWD1) matches the stored value of HASH_PSWD0. Once the password PSWD1 is authenticated, the encrypted key PSWD0_RAN_KEY0=ENC_1 (PSWD0, RAN_KEY0) may be retrieved. A symmetric decryption operation may be performed RAN_KEY0=DEC_1(PSWD1, PSWD0_RAN_KEY0). The recovered random key RAN_KEY0 is in turn encrypted with the two-way symmetric encryption engine ENC_1 with the new and confirmed password PSWD2. It produces the new encrypted random key PSWD0_RAN_KEY0=ENC_1 (PSWD2, RAN_KEY0). Smart security storage 210 is then ready for operation.

For a storage output operation, original data DATA0 is received from smart device 240 or from host computing device 205, depending on the state of the switch select 237. Original data DATA0 may be routed through channel 213 to target module 215. The recovered random key RAN_KEY1, which is identical with the original random key RAN_KEY0, may be provided to a data two-way symmetric encryption engine ENC_D corresponding to security module 220 to encrypt the data RAN_KEY0_DATA0=ENC_D (RAN_KEY1, DATA0) flowing from channel 217 to channel 223 and to write to memory 225. Encrypted data stored in the memory 225 is written in the form of RAN_KEY0_DATA0.

For a storage input operation, the recovered random key RAN_KEY1, which is identical with the original random key RAN_KEY0, may be provided to the data two-way symmetric decryption engine DEC_D corresponding to security module 220 to decrypt the data RAN_KEY0_DATA0 flowing from memory 225 through channel 223 to channel 217. The decrypted data DATA0=DEC_D(RAN_KEY1, RAN_KEY0_DATA0) may eventually be routed through channel 213 to communication module 230 and back to either smart device 240 or host computing device 205, depending on the state of the switch select 237.

Memory 225 may refer to a non-volatile memory storage, e.g., flash memory, solid state disk (SSD), or hard disk, that is designed, programmed, and/or configured to, at least, store data to be accessed by at least smart device 240 but also host computing device 205.

Communication module 230 may refer to a module or component that is designed, programmed, and/or configured to, at least, facilitate or execute communication between host computing device 205 and one or more components corresponding to smart security storage 210, including communication module 230 itself, via communication channel 207.

Non-limiting examples of communication module 230 may include a wired connection, a wireless connection, or biometric interface, all designed, programmed, and/or configured to facilitate communication between host computing device 205 and one or more components corresponding to smart security storage 210, via communication channel 207. Communication module 230 may be communicatively connected to smart device interface 235 via channel 231.

Smart device interface module 235 may refer to a module or component that is designed, programmed, and/or configured to, at least, facilitate or execute interaction, i.e., interface, between smart device 240 and one or more components corresponding to smart security storage 210, via channel 243. Smart device interface module 235 controls the traffic of interface switch 2300 via the switch select 237 and communication channel 231 and 243.

Non-limiting examples of smart device interface 235 may include a wired connection, a wireless connection, or biometric interface, all designed, programmed, and/or configured to facilitate communication between smart device 240 and one or more components corresponding to smart security storage 210, via communication channel 243.

Examples of the respective communication channels described herein may include any one or more of a wired connection, a wireless connection, or biometric interface, including but not limited to USB, Lightning, Type-C, LAN, WiFi, Thunderbolt, WAN, Fingerprint scanner, retina scanner, facial recognition, audio recognition and others.

Switch select 237, which may be controlled by smart device interface 235, may refer to a module or component that is designed, programmed, and/or configured to determine traffic directions among the three communication channels 207, 213, and 231.

Smart device 240 may refer to a processor-enabled device including, but not limited to, a mobile device, e.g., notebook, laptop, smart phone, tablet, etc., that may be communicatively connected smart security storage 210 via channel 243.

Access application 245 may refer to a logic-based module or component that is designed, programmed, and/or configured to, under the control of smart device 240, facilitate or execute identification, authentication, and/or access control of smart security storage 210. Notably, host computing device 205 has no counterpart to access application 245, and is thus unable to control one or more of the access control functions of smart security storage 210. As set forth above, the logical connection between host computing device 205 and target memory 225 is dependent upon operation of access application 245, via switch select 237. The host computing device 205 performs storage functions in exploration and access to the memory 225, after security functions are facilitated or executed d by the smart device 240 via the access application 245.

The identification, authentication and access control functions that may be facilitated and/or controlled by access application 245, in cooperation with security module 220, may include, as non-limiting examples, smart security storage identification, initialization, configuration, key generation, password initialization, modification, and/or authentication. Hardware encryption/decryption of the data stored on memory 225 through security module 220.

Access application 245 may be launched on smart device 240. The user of smart device 240 may be authenticated on access application 245 by entering a password and/or by biometric authentication using a sensor, i.e., retina scanner, fingerprint reader, etc., corresponding to smart device 240. Upon authentication of the user, smart device 240 may be communicatively connected to smart security storage 210 via communication channel 243. Smart device 240 may then have priority control over functionality of smart security storage 210 via switch select 237. For example, a random key to control encryption/decryption operation inside the security module 220 may be retrieved. The key may then be used to encrypt or decrypt the data passing between security module 220 and memory 225. Then, the data from either smart device 240 or host computing device 205 may be retrieved or stored from/to memory 225.

Communication traffic may flow from channel 231 through communication module 230 then through channel 213 to target module 215. Security functions for memory 225 may be facilitated or executed through operation of access application 245 corresponding to smart device 240. Further, hardware encryption/decryption of data stored in the memory 225 may be facilitated or executed by security module 220, again under control of access application 245. Data securely stored on memory 225 may be explored and accessed through control of access application 245 under storage functions.

In accordance with at least some embodiments, host computing device 205 initially has no logical access to smart security storage 210, even if the communication channel 207 is communicatively connected to smart security storage 210. Thus, as referenced above, once the user is authenticated on the smart device 240 through access application 245, switch select 237 may be changed by user command or in an automated manner, via smart device interface 235. If the switch select 237 is changed to enable communication between the channel 207 and 213 instead, host computing device 205 may have the same logical exploration and access to the secured data stored in the memory module 225, just like the aforementioned secured operation between the smart device and the memory module 225 through the operation of the target module 215 and security module 220 under storage functions.

When the communicative connection of channel 207 is logically disconnected or smart security storage 210 is powered off, switch select 237 may revert back to its original state to turn off logical communication channel 207 and select smart device 240 as the legitimate host device. All operations including identification, authentication, and access control to the smart secure storage 210 require another iteration of identification, authentication, access control, in order for the secured data on memory 225 to be accessed. The encrypted data stored in the memory 225 remains intact until an authorized security reset is performed by the access application 245.

The access application 245 provides the users with interactive security functions including initialization, security reset, password authentication, and password change. After user authentication, the data paths between the host computing device 205 and the target module 215 are established. In this embodiment, the data paths pass through the first communication channel 207 and the second communication channel 213, among the host computing device 205, the communication module 230 and the target module 215. The control paths pass through the third communication channel 231 and the second communication channel 213, among the smart device 240, the communication module 230 and the target module 215.

In another exemplary embodiment, the above mentioned roles between the smart device 240 and access application 245 changes to between the host computing device 205 and access application 255, or the host computing device 205 and access application 238, respectively.

Another embodiment of a possible logical connection between host computing device 205 and target memory 225 corresponding to smart security storage 210 is dependent upon operation of access application 255 residing in the host computing device 205. The access application 255, has similar functions like those of the access application 245. It provides the users with interactive security functions including initialization, security reset, password authentication, and password change. After user authentication, the data paths between the host computing device 205 and the target module 215 are established. Further, it establishes the first communication channel 207 and the second communication channel 213. respectively. In this embodiment, both data path and control path between the host computing device 205 and the target module 215 are passing through the first communication channel 207 and the second communication channel 213, without the involvement of the smart device 240 or the third communication channel 231.

Yet, another embodiment of a possible logical connection between host computing device 205 and target memory 225 corresponding to smart security storage 210 is dependent upon operation of access application 238 residing in the communication module 230. The access application 238, has similar functions like those of the access application 245. It provides the users with interactive security functions including initialization, security reset, password authentication, and password change. After user authentication, the data paths between the host computing device 205 and the target module 215 are established. Further, it establishes the first communication channel 207 and the second communication channel 213. respectively. In this embodiment, both data path and control path between the host computing device 205 and the target module 215 are passing through the first communication channel 207 and the second communication channel 213, without the involvement of the smart device 240 or the third communication channel 231.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:
1. A smart security storage, comprising:
a communication module, a target module, a smart device interface, a security module, and a memory;
wherein the communication module communicates with a host computing device, the target module, and the smart device interface via a first, second, and third communication channel, respectively;
wherein the smart device interface communicates with the communication module and a smart device,
wherein the smart device interface includes:
at least one of: a design, program, or configuration to, at least, facilitate or execute interaction, between the smart device and one or more components corresponding to the smart security storage, and a switch select for controlling three-way interface traffic flow for the communication module between the first and second communication channel or between the second and third communication channel;

wherein the target module:

communicates with the communication module and the security module, and connects to the security module in response to an instruction from the smart device;

wherein the security module:

communicates with the target module and the memory, and enables one or more security operations to be performed on data stored on the memory; and wherein the memory:

communicates with the security module, and enables the one or more security operations to be performed on the data stored thereon.

2. The smart security storage of claim 1, wherein the memory is a flash memory storage device.

3. The smart security storage of claim 1, wherein the memory is a solid-state disk storage device.

4. The smart security storage of claim 1, wherein the memory is a non-volatile disk storage device.

5. The smart security storage of claim 1, wherein the smart device interfaces with the smart security storage via a wired communication module.

6. The smart security storage of claim 1, wherein the smart device interfaces with the smart security storage via a wireless communication module.

7. The smart security storage of claim 1, wherein the smart device interfaces with the smart security storage via a biometric communication module.

8. The smart security storage of claim 1, wherein when the switch select enables traffic flow between the second and third communication channel, traffic flow of the first communication channel is ignored.

9. The smart security storage of claim 8, wherein when the switch select enables traffic flow between the first and second communication channel, traffic flow of the third communication channel is ignored.

10. The smart security storage of claim 1, wherein the one or more security operations to be executed by the security module include initialization and password authentication.

11. The smart security storage of claim 10, wherein the one or more security operations to be executed by the security module further includes encryption/decryption of the data stored on the memory, executed upon execution of password authentication.

12. The smart security storage of claim 11, wherein, upon execution of encryption/decryption, the data stored on the memory may be explored and accessed by the host computing device and the smart device.

13. The smart security storage of claim 11, wherein, upon execution of encryption/decryption, a smart device interface module controls the switch select to control the interface traffic to allow authorized exploration and access to the data stored on the memory by the host computing device and the smart device.

14. A smart security storage sub-system, comprising:
a smart device, including:
an access application to:
authenticate a user of the smart device, and
control security functionality for exploration and access of data, for both a host computing device and the smart device; and
a smart security storage, including:
a communication module, a target module, a smart device interface, a security module, and a memory;
wherein the communication module communicates with the host computing device, the target module, and the smart device interface via a first, second, and third communication channel, respectively;
wherein the smart device interface communicates with the communication module and the smart device, and
wherein the smart device interface includes:
at least one of: a design, program, or configuration to, at least, facilitate or execute interaction, between the smart device and one or more components corresponding to the smart security storage, and
a switch select for controlling three-way interface traffic flow for the communication module between the first and second communication channel or between the second and third communication channel;
wherein the target module, that:
communicates with the communication module and the security module, and
connects to the security module in response to an instruction from the smart device;
wherein the security module:
communicates with the target module and the memory, and
enables one or more security operations to be performed on data stored on the memory;
wherein the memory:
communicates with the security module, and
enables the one or more security operations to be performed on the data stored thereon.

15. The smart security storage sub-system of claim 14, wherein the communication module includes an access application to:
authenticate a user of the smart security storage, and
control security functionality for exploration and access of data for the smart security storage.

16. A smart security storage system, comprising:
a host computing device;
a smart device, including an access application to:
authenticate a user of the smart device, and
control security functionality for exploration and access of data for both the host computing device and the smart device; and
a smart security storage, including:
a communication module, a target module, a smart device interface, a security module, and a memory;
wherein the communication module communicates with the host computing device, the target module, and the smart device interface via a first, second, and third communication channel, respectively;
wherein the smart device interface communicates with the communication module and the smart device;
wherein the smart device interface includes:
at least one of: a design, program, or configuration to, at least, facilitate or execute interaction, between the smart device and one or more components corresponding to the smart security storage, and a switch select for controlling three-way interface traffic flow for the communication module between the first and second communication channel or between the second and third communication channel;

wherein the target module:
communicates with the communication module and the security module, and
connects to the security module in response to an instruction from the smart device;

wherein the security module:
communicates with the target module and the memory, and
enables one or more security operations to be performed on data stored on the memory; and wherein the memory:
communicates with the security module, and
enables the one or more security operations to be performed on the data stored thereon.

17. The system of claim 16, wherein the host computing device includes an access application to:
authenticate a user of the smart security storage, and
control security functionality for exploration and access of data for the smart security storage.

18. The system of claim 16, wherein the communication module includes an access application to:
authenticate a user of the smart security storage, and
control security functionality for exploration and access of data for the smart security storage.

* * * * *